United States Patent
Kaminski et al.

[11] Patent Number: 5,967,495
[45] Date of Patent: Oct. 19, 1999

[54] CABLE FEEDING APPARATUS AND METHOD

[75] Inventors: Gerald A. Kaminski, Olmsted Township; Dennis B. Laska, Sheffield Lake; Joseph V. Negowski; Robert C. Brod, both of Lorain, all of Ohio

[73] Assignee: Arnco Corporation, Elyria, Ohio

[21] Appl. No.: 09/121,501

[22] Filed: Jul. 23, 1998

Related U.S. Application Data

[62] Division of application No. 08/734,384, Oct. 17, 1996, Pat. No. 5,813,658, which is a continuation of application No. 08/344,447, Nov. 23, 1994, abandoned.

[51] Int. Cl.$^6$ ......................................................... B66F 3/24
[52] U.S. Cl. .......................................................... 254/134.4
[58] Field of Search .................................. 254/134.3 FT, 254/134.3 R, 134.4; 15/109.06 R; 226/24–45, 178

[56] References Cited

U.S. PATENT DOCUMENTS

| | | |
|---|---|---|
| 3,400,542 | 9/1968 | Davis . |
| 3,610,582 | 10/1971 | Passoni . |
| 3,654,114 | 4/1972 | Brandstaetter . |
| 3,658,222 | 4/1972 | Dressel et al. ............................. 226/25 |
| 3,781,532 | 12/1973 | Dorsman et al. ......................... 226/30 |
| 3,793,732 | 2/1974 | Hamrick . |
| 3,887,163 | 6/1975 | Prange . |
| 3,912,225 | 10/1975 | Earnheart . |
| 4,094,452 | 6/1978 | Makela . |
| 4,185,809 | 1/1980 | Jonnes . |
| 4,411,409 | 10/1983 | Smith . |
| 4,454,999 | 6/1984 | Woodruff . |
| 4,468,003 | 8/1984 | Nonclereq, et al. . |
| 4,502,666 | 3/1985 | Mattelon et al. . |
| 4,508,281 | 4/1985 | Plater . |
| 4,576,362 | 3/1986 | Langston . |
| 4,691,896 | 9/1987 | Reeve et al. . |
| 4,702,404 | 10/1987 | Einsle et al. . |
| 4,756,510 | 7/1988 | Klamm et al. . |
| 4,783,054 | 11/1988 | Morel et al. . |
| 4,796,970 | 1/1989 | Reeve et al. . |
| 4,822,005 | 4/1989 | Aleshire . |
| 4,836,503 | 6/1989 | Giroux . |
| 4,840,352 | 6/1989 | Ellis . |
| 4,848,734 | 7/1989 | Ford . |
| 4,850,569 | 7/1989 | Griffioen et al. . |
| 4,856,760 | 8/1989 | Frost et al. ............................. 254/134.4 |
| 4,934,662 | 6/1990 | Griffioen et al. . |
| 4,948,097 | 8/1990 | Reeve et al. . |
| 5,022,634 | 6/1991 | Keeble . |
| 5,048,798 | 9/1991 | Araki et al. ............................ 254/134.4 |
| 5,121,644 | 6/1992 | Grey et al. ............................. 254/134.4 |
| 5,121,901 | 6/1992 | Cassidy et al. . |
| 5,143,353 | 9/1992 | Sano et al. ............................. 254/134.4 |
| 5,156,376 | 10/1992 | Spicer . |
| 5,163,657 | 11/1992 | Sano et al. . |
| 5,165,662 | 11/1992 | Jenkins . |
| 5,169,126 | 12/1992 | Reeve et al. ........................... 254/134.4 |
| 5,181,271 | 1/1993 | Jenkins . |
| 5,197,715 | 3/1993 | Griffioen . |
| 5,199,689 | 4/1993 | Proud et al. . |
| 5,205,542 | 4/1993 | Keeble . |
| 5,211,377 | 5/1993 | Griffioen et al. . |
| 5,236,178 | 8/1993 | Cole . |
| 5,248,128 | 9/1993 | Warren et al. . |
| 5,308,041 | 5/1994 | Griffioen et al. ....................... 254/134.4 |
| 5,467,968 | 11/1995 | Proud et al. ........................... 254/134.4 |

*Primary Examiner*—Robert C. Watson
*Attorney, Agent, or Firm*—Pearne, Gordon, McCoy & Granger LLP

[57] ABSTRACT

An improved cable feeder uses tractor type drive belts and compressed air to propel cable through a conduit. The axial force applied to the cable is sensed with a strain gauge near the conduit or a pressure detector in a hydraulic system powering the drive belts. If excessive force is applied, hydraulic fluid is diverted from the drive belts. The radial force applied to the cable is limited by a calibrated spring. The feeder can also be arranged in a mid-assist configuration. Conduits and the cable are sealed to maintain air pressure. A by-pass pipe is provided to convey pressurized air from a first conduit to a succeeding conduit.

9 Claims, 7 Drawing Sheets

CABLE FEEDING APPARATUS AND METHOD

This is a divisional of application Ser. No. 08/734,384, filed on Oct. 17, 1996, now U.S. Pat. No. 5,813,658, which is a continuation of Ser. No. 08/344,447, filed on Nov. 23, 1994, now abandoned.

BACKGROUND OF THE INVENTION

1. Field of the Invention

This invention relates generally to the field of cable installation and specifically to an apparatus for feeding cable into a conduit.

2. Description of the Related Art

Cables are continually being installed to replace or supplement existing cables. For instance, fiber optic cables are installed to support growing communications networks. The fiber optic cables are installed in new locations or to replace electrical cables in existing locations.

The cables are commonly installed in passages, such as conduits or ducts, by applying an axial force to the cable. The axial force may be a tensile force applied at a leading part of the cable to pull the cable through the conduit. Alternatively, the axial force may be a compressive force applied to a trailing part of the cable to push the cable into the conduit. A preferred method utilizes both tensile and compressive forces.

Conduits or ducts are commonly plastic, metal, or concrete tubes defining an elongated passage in an aerial, submerged, underground, or other installation. A conduit may extend for several kilometers and includes curves and slopes. The interior surface of the conduit is preferably a low friction material or is provided with a low friction coating. The passage in the conduit should be free from obstructions to permit the cable to pass therethrough without interference.

Different apparatus and methods are known for applying the tensile and/or compressive axial forces on the cable for installation in the conduit. In some configurations, a fluid, such as air, is forced along the outer surface of the cable to create a drag force. The drag force tends to propel the cable through the conduit. In other configurations, the leading end of the cable is provided with a dart, also known as a pig, plug, drogue, etc. The dart is pushed by the fluid and pulls the cable. Some configurations are also provided with a driver, such as rotating wheels or belts, that engages the outer surface of the cable and pushes the cable into the conduit. Examples of these configurations and related components are shown in U.S. Pat. Nos. 4,756,510, 4,850,569, 4,934,662, 5,121,644, 5,156,376, 5,163,657, 5,197,715, 5,211,377, and 5,308,041, all incorporated herein by reference.

According to some prior art systems for installing cables, low pushing forces are utilized with high volumes of compressed air (350 cubic feet per minute or more). Such systems require large compressors to propel the cable through the conduit. Even with high volumes of air, inflexibility of the cable, obstructions, or curved conduit paths limit the effectiveness of the installation. In practice, these systems are limited to installing cables of about 2000 to 3500 feet in length and additional compressors are required along the installation path. Smaller compressors can be used when a more powerful pushing tractor is used. However, such tractors increase the risk of damaging the cable, which is designed to endure tensile and radial loads, not axial compressive loads. The resulting damage involves redistribution of the fibers, as well as excessive bending or kinking. In addition, the tractor belts are prone to slipping on the cable, thereby damaging the cable jacket.

It is desirable to maximize the length of cable that can be installed without interruption, and to reduce the size and number of air compressors required. As the length increases, the force required to continue installation increases. Fiber optic cables are often more delicate than metal cables. Therefore, the method and apparatus used for installation of fiber optics must not damage the cable while providing the necessary installation forces. In addition, the installation should be automatically controlled and use a minimum amount of equipment to improve efficiency.

These problems are largely solved in the present invention by using a lower air volume and a greater pushing force. Damage to the cable from the greater force is prevented by sensing the force applied to the cable. A feed back system controls the pushing force based on the force sensed. Pushing is also controlled based on the velocity of the cable. Damage is further prevented by limiting the radial force applied.

The number of compressors required is reduced by providing a "mid-assist" cable feeder with a by-pass pipe to convey pressurized air from one conduit or duct to a succeeding conduit or duct. With the present invention, distances exceeding 5,000 feet between cable feeders can be achieved and compressors are not required at mid-assist locations.

SUMMARY OF THE INVENTION

The present invention provides a cable installation apparatus and method that reduce the chances of cable damage. The radial force applied to the cable is limited, and feedback sensors control installation to prevent excessive axial force being applied to the cable. Greater pushing force is applied to the cable, and smaller and fewer air compressors are required. A mid-assist configuration provides a by-pass for compressed air from a first conduit to a succeeding conduit.

According to one embodiment of the invention, the apparatus for installing the cable into a conduit includes a driver adapted to engage the cable to propel the cable forwardly into the conduit; and a sensor for measuring axial force, in particular, the axial compressive load, applied to the cable by the driver. The driver is a pair of opposed rotating members, such as belts, adapted to frictionally engage the cable. The opposed rotating members are separable to permit insertion of the cable therebetween. At least one of the rotating members is radially adjustable relative to the cable.

The sensor is a strain gauge or other device adapted to measure the axial force based on relative movement of the conduit and the driver. The strain gauge is rigidly mounted relative to the driver and the conduit is rigidly mounted in a duct clamp, the duct clamp being movably mounted relative to the driver and operatively in contact with the strain gauge so that the strain gauge measures the force tending to move the conduit. The driver is controlled responsive to the force sensed by the sensor by discontinuing propelling of the cable when the force sensed by the sensor exceeds a specified limit.

The apparatus also includes a fluid power system for powering the driver. The fluid power system is hydraulic, and the sensor comprises a hydraulic pressure detector for sensing pressure delivered to the driver. The hydraulic system is adapted to divert hydraulic fluid from the driver when the force sensed by the sensor exceeds a specified limit. A by-pass is connected to divert hydraulic fluid from the driver.

A fitting is adapted to be connected to a compressed air source, said fitting directing the air into the conduit to propel the cable through the conduit. An injection block defining a plenum is adapted for communicating compressed air from the source to the conduit. A seal disposed around the conduit and a seal disposed around the cable isolate the plenum from ambient air. A clamp secures the conduit adjacent the driver. The seals comprise generally symmetrical components that are separable for installation of the conduit and cable, respectively. The seals also comprise inserts that are replaceable according to the respective sizes of the conduit and cable.

A radial force limiter, such as a spring, limits radial force applied to the cable by the rotating members. A threaded member is adapted to position at least one of said rotating members, said spring being operatively disposed between the threaded member and the rotating member. A calibrated stop limits travel of the threaded member to limit a force of the spring applied to the rotating member.

The apparatus also includes a sensor for measuring velocity of the cable passing through the driver. The driver is controlled responsive to velocity sensed by the velocity sensor. The driver is adapted to discontinue propelling the cable when a velocity sensed by the sensor exceeds a specified limit. The hydraulic system powering the driver is adapted to divert hydraulic fluid from the driver when a velocity sensed by the sensor exceeds a specified limit. The velocity exceeds the specified limit when the velocity falls below a minimum or rises above a maximum.

According to another embodiment of the invention, the apparatus is adapted for installing cable from a first conduit into a succeeding conduit, said cable being propelled through said first conduit by compressed air in the first conduit. The driver is adapted to engage the cable to propel the cable forwardly into the succeeding conduit. A pipe is connected to define an airtight passage between the first conduit and the succeeding conduit. The pipe is adapted to direct the compressed air into the succeeding conduit to propel the cable through the succeeding conduit. An exit seal is provided for mounting an end of the first conduit from which the cable projects adjacent an entrance end of the driver. An entrance seal for mounting an end of the succeeding conduit into which the cable is to be installed is located adjacent an exit end of the driver. The seals define respective plena communicating the conduits with the pipe and isolating the driver from the compressed air. Seals are provided around the cable to isolate the plena from ambient air. The sensor measures axial force applied to the cable by the driver.

The invention also provides a method of installing cable in a conduit. The steps include propelling the cable through the conduit with a driver; sensing axial force applied to the cable; and controlling the driver in response to sensed forces. An additional step includes propelling the cable through the conduit with compressed air. The step of controlling the driver includes the step of diverting hydraulic fluid from the driver when an axial force exceeding a specified maximum is sensed. The step of sensing includes measuring relative axial movement of the driver and conduit and/or sensing a pressure of hydraulic fluid being delivered to the driver.

DESCRIPTION OF THE PREFERRED EMBODIMENTS

Figure 1:
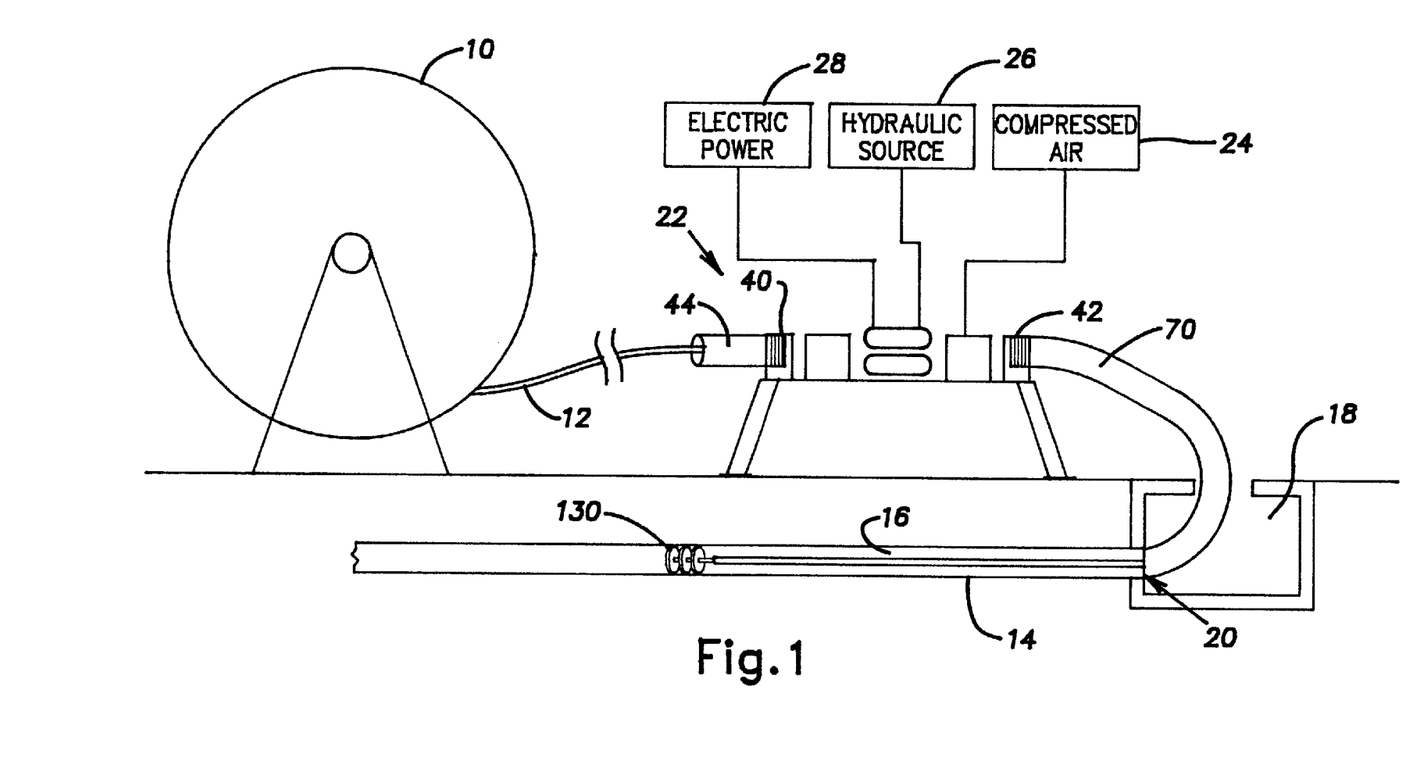
FIG. 1 shows a schematic diagram of a cable installing operation using a cable feeder in a feed configuration according to the present invention.

Referring to FIG. 1, a reel 10 of cable 12 is to be installed in a conduit 14, such as a duct, defining an underground passage 16. A port 18 allows access to an entrance 20 of the conduit 14. The cable 12 is fed into the conduit 14 with a cable feeder 22. Sources of compressed air 24, hydraulics 26, and electric power 28 are connected to the cable feeder 22. Preferably, the compressed air 24 is provided at 175 to 375 cubic feet per minute (CFM) and 90 to 115 pounds per square inch (PSI). Alternatively, another fluid can be used instead of compressed air. The hydraulics are preferably provided at 2 to 5 gallons per minute (GPM) and 1500 PSI. The electrical source is preferably a 12 volt direct current (VDC) battery.

Figure 2:
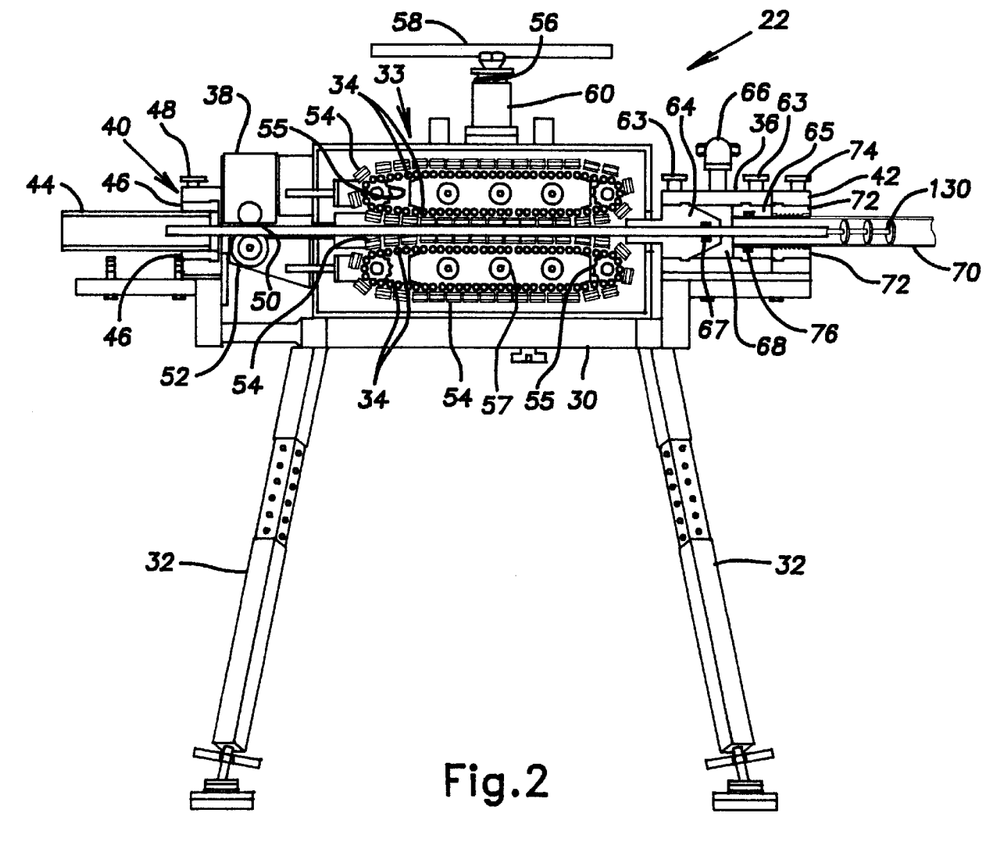
FIG. 2 shows a partially cut away elevational front view of a cable feeder according to the invention.

Referring to FIG. 2, the cable feeder 22 includes a support stand 30 having adjustable legs 32 resting on the ground or another suitable surface. Mounted on the support is a driver 33 such as a pair of opposed continuous drive belts 34. Alternatively, the driver 33 can be opposed wheels or a reel and guide. An air injection block 36 is located adjacent to an exit end of the driver 33. An encoder 38 is disposed adjacent to an entrance end of the driver 33. An entrance duct clamp 40 and an exit duct clamp 42 are located at opposite ends of the stand 30.

The entrance duct clamp 40 releasably holds a entrance duct 44 for guiding the cable 12 past the encoder 38 and toward the driver 33. Preferably, the entrance duct 44 is a cylindrical length of polyethylene tubing. The entrance duct clamp 40 includes a pair of opposed jaws 46 operated by a handle 48 and a threaded bolt or post.

The encoder 38 includes a wheel 50 that frictionally engages the cable 12. An opposed idler wheel 52 ensures engagement of the wheel 50 with the cable 12. The encoder, such as a Balluff Part No. BES-5K-343-EO-C3, determines speed and length of cable 12 passing the encoder as measured by rotation of the wheel 50.

The drive belts 34 are separable to permit installation of the cable 12 therebetween. The drive belts 34 include segmented, contoured tractor treads 54 adapted to frictionally engage and capture the cable 12. The drive belts 34 are preferably endless chains driven by sprockets 55 and supported on rails 57. The treads 54 are preferably a flexible material, such as natural rubber or urethane. A load spring 56, such as McMaster Part No. 9297k92, operated by a handle 58 and threaded member positions the drive belts 34 so that the treads 54 firmly engage the cable 12 without crushing or damaging the cable. A stop 60, such as a calibrated limit cylinder, limits travel of the handle 58. The stop 60 and load spring 56 are calibrated to precisely set the radial force applied to the cable 12 by the drive belts 34 when the handle 58 is rotated down to the stop 60. The stop 60 is removable and replaceable with stops having different heights corresponding to the proper radial forces to be applied to different cables based on cable diameter, cable type, or other conditions. The drive belts are powered by hydraulic motors 62 or other power transmission devices, shown in FIG. 3 and discussed below.

The air injection block 36 is provided with an entrance seal insert 64 and an exit seal insert 65 adapted to permit passage of the cable 12 therethrough while maintaining an airtight seal. The injection block 36, entrance seal insert 64, and exit seal insert 65 are each separable into two generally symmetrical halves to permit installation of the cable 12 therebetween. The seal inserts 64, 65 and other seal inserts discussed below are removable and replaceable with similar inserts adapted for different cable and conduit diameters. Securing means, such as handles 63 and threaded bolts or shafts, are operable to secure the parts of the injection block 36 in a closed position. The entrance seal insert 64 provides a passage slightly larger than the cable 12. A pair of gaskets 67 are provided in the entrance seal insert 64 to seal around the cable. A fitting 66 is provided to permit injection of compressed air 24 into the injection block 36.

The exit duct clamp 42 is secured to the air injection block 36 to secure the duct 70 to the injection block 36. The injection block 36 defines a plenum 68 closed by the entrance seal insert 64 and the exit seal insert 65. A guide duct 70 is releasably held in the exit duct clamp 42. Preferably, the guide duct 70 is a cylindrical length of polyethylene tubing. The exit duct clamp 42 includes a pair of opposed jaws 72 operated by a handle 74 and a threaded post or bolt. A duct seal 76, such as a pair of gaskets, is provided to seal around the guide duct 70. The exit duct clamp 42 and duct seal 76 seal the injection block 36 and guide duct 70 to direct passage of air from the plenum 68 into the guide duct 70.

Figure 3:
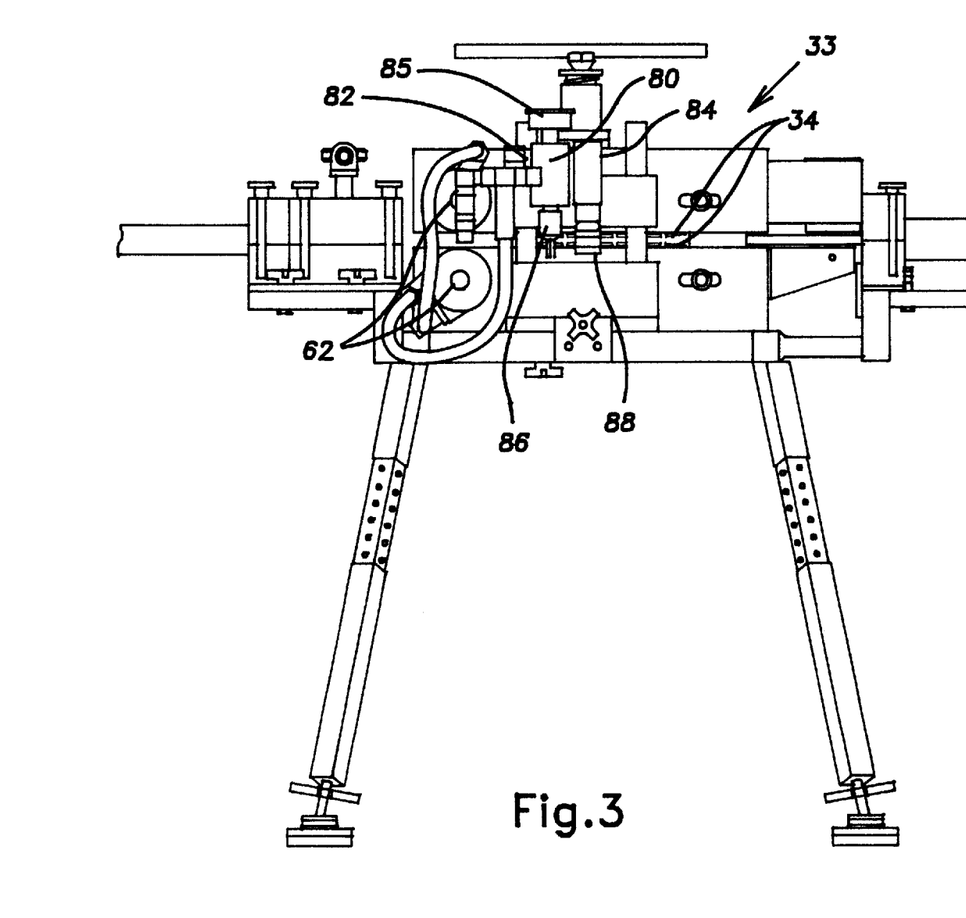
FIG. 3 shows an elevational rear view of the cable feeder.

Referring to FIG. 3, the hydraulic motors 62 are mounted on the rear of the driver 33 and operatively connected to power the drive belts 34. The hydraulic motors 62 are connected to a hydraulic manifold 80, by suitable fluid conveying hoses and connectors. A solenoid operated by-pass valve 82 is connected in parallel with the motors 62. The hydraulic manifold 80 is provided with a pressure detector 84 (such as Barksdale Part No. 400H3-13CG-Q11), a pressure gauge 85, and a relief cartridge 86. The hydraulic source 26 (FIG. 1) is connectable to the hydraulic manifold 80 in a conventional manner. A junction box 88 is also provided for connection of electric power 28 to electrical components of the driver 33.

Figure 4:
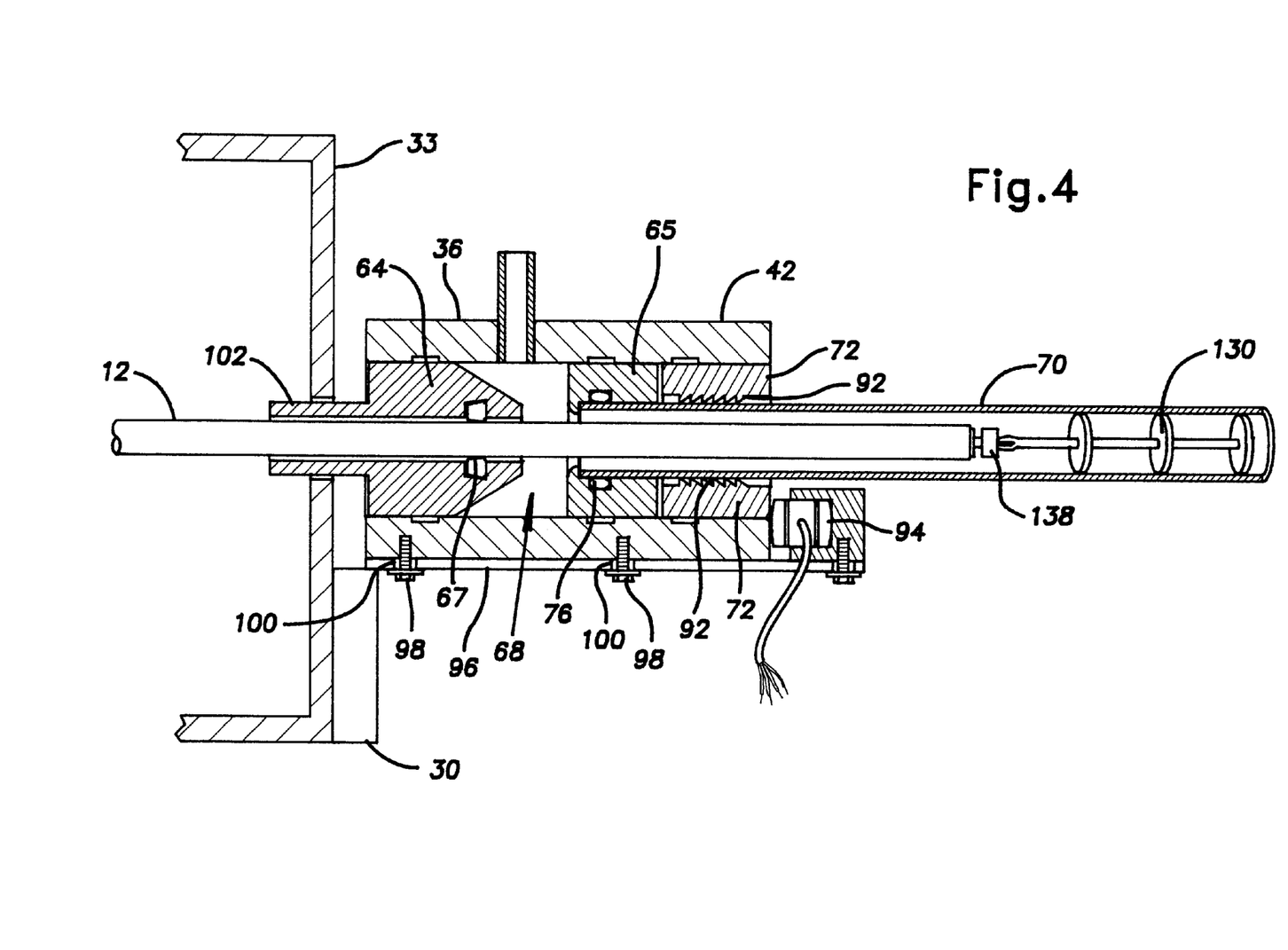
FIG. 4 shows a detailed front sectional view of an air injection block and exit duct clamp on the cable feeder shown in FIG. 2.

Referring to FIG. 4, the insert 64 and seal 67 are preferably made of materials having low coefficients of friction. As shown, the entrance seal insert 64 is tapered so that air inside the injection block 36 is directed toward the exit seal insert 65. The seal 90 and insert 64 do not substantially impede movement of the cable 12 and do not permit leakage of air from the injection block 36. Serrations 92 or teeth are provided on inner faces of the jaws 72 of the exit duct clamp 42 to firmly grip the guide duct 70.

A force transducer, such as a strain gauge 94 is rigidly mounted on a base 96 fixed to the support stand 30. The strain gauge 94 is operatively in contact with the exit duct clamp 42. The duct clamp 42 and injection block 36 are slidingly mounted on the base 96, for example with bolts 98 through slotted mounting holes 100. A tail section 102 of the cable seal insert 64 is slidingly received in an end of the driver 33. The cable 12 moving through the duct 70 tends to urge the injection block 36 and duct clamp 42 toward the strain gauge 94. The strain gauge 94 is a piezoresistive element or other device (e.g., A.L. Design model No. ALD-W-3) suitable for measuring the relative frictional force between the duct 70 and the cable 12 to determine the axial compressive force applied to the cable 12.

Figure 5:
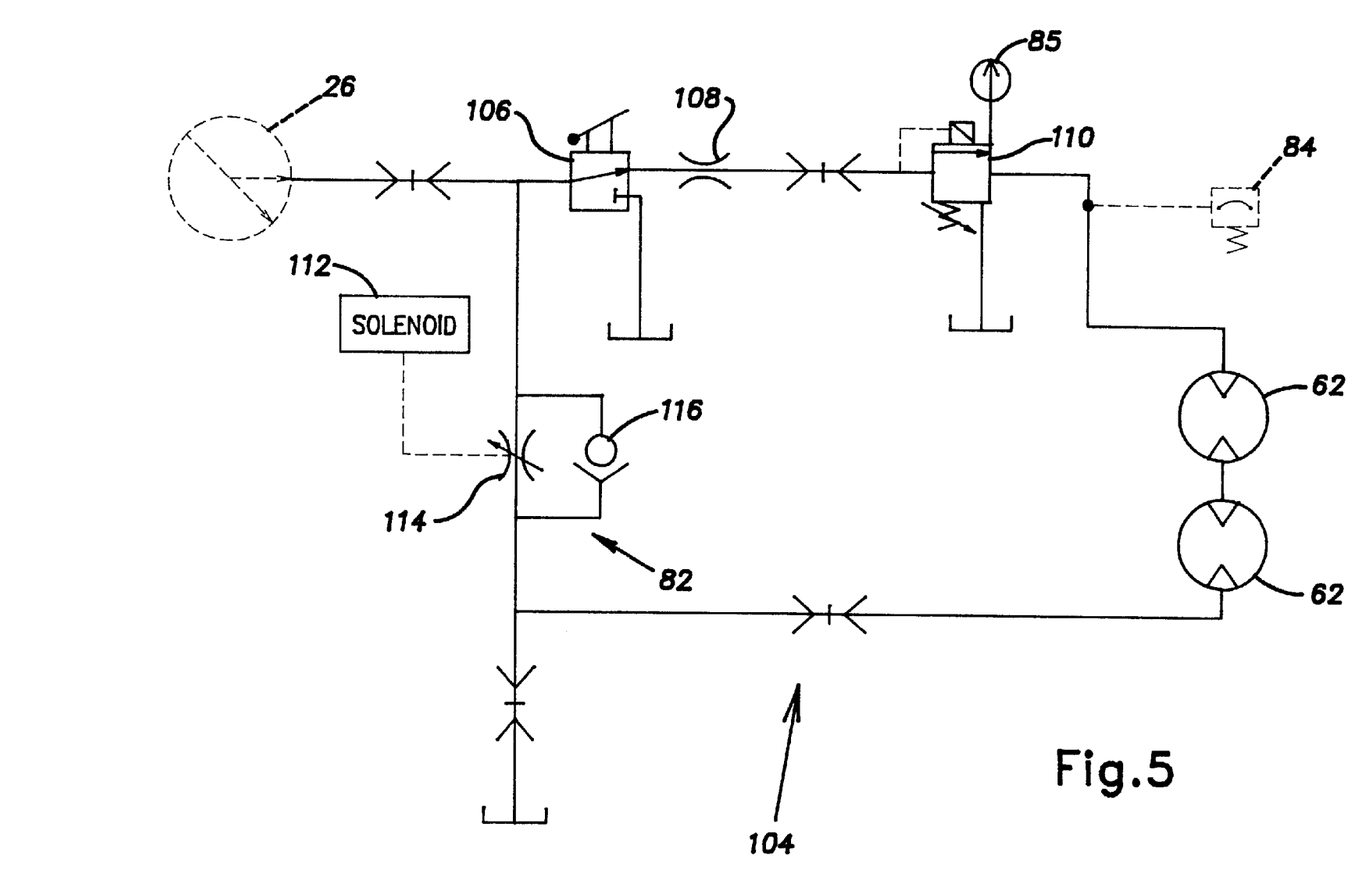
FIG. 5 shows a schematic diagram of a hydraulic system of the cable feeder.

Referring to FIG. 5, the hydraulic source 26 comprises, for example, a pump having a capacity of about three gallons per minute of hydraulic fluid. The hydraulic source 26 is connected to power the hydraulic motors 62 through a hydraulic system 104. Alternatively, the driver 33 can be powered by another fluid power system or another source of power such as electricity. The hydraulic system 104 includes an actuator valve 106, a fixed restriction 108, and a pressure control 110 connected in series with the motors 62. The by-pass valve 82 is connected in parallel across the motors 62 and the other components of the system 104. The actuator valve 106 selectively directs hydraulic fluid toward the motors 62 or to a reservoir to respectively actuate or disable the motors 62. The fixed restriction 108 limits flow to the motors 62 to a maximum of about five gallons per minute. The pressure control 110 is preferably a manually adjustable, pressure regulating, reducing valve. As discussed in more detail below, the pressure control 110 limits the hydraulic pressure to the motors 62 to limit the force applied on the cable 12 by the drive belts 34. The normal pressure is typically about 500 to 1350 PSI at the motors, depending on cable characteristics. The pressure detector 84 is connected to measure pressure delivered to the hydraulic motors 62. The pressure detector 84 is calibrated to measure axial compressive force applied to the cable 12 by the drive belts 34 by correcting for internal friction of the mechanical parts of the motors 62 and belts, and the force required to pull the cable 12 from the reel 10. The by-pass valve 82 includes a solenoid 112 operated variable restriction 114 and a check valve 116. The variable restriction 114 is adjustable to divert part of the flow away from the motors 62 and to the reservoir, as discussed below.

Figures 6, 7:
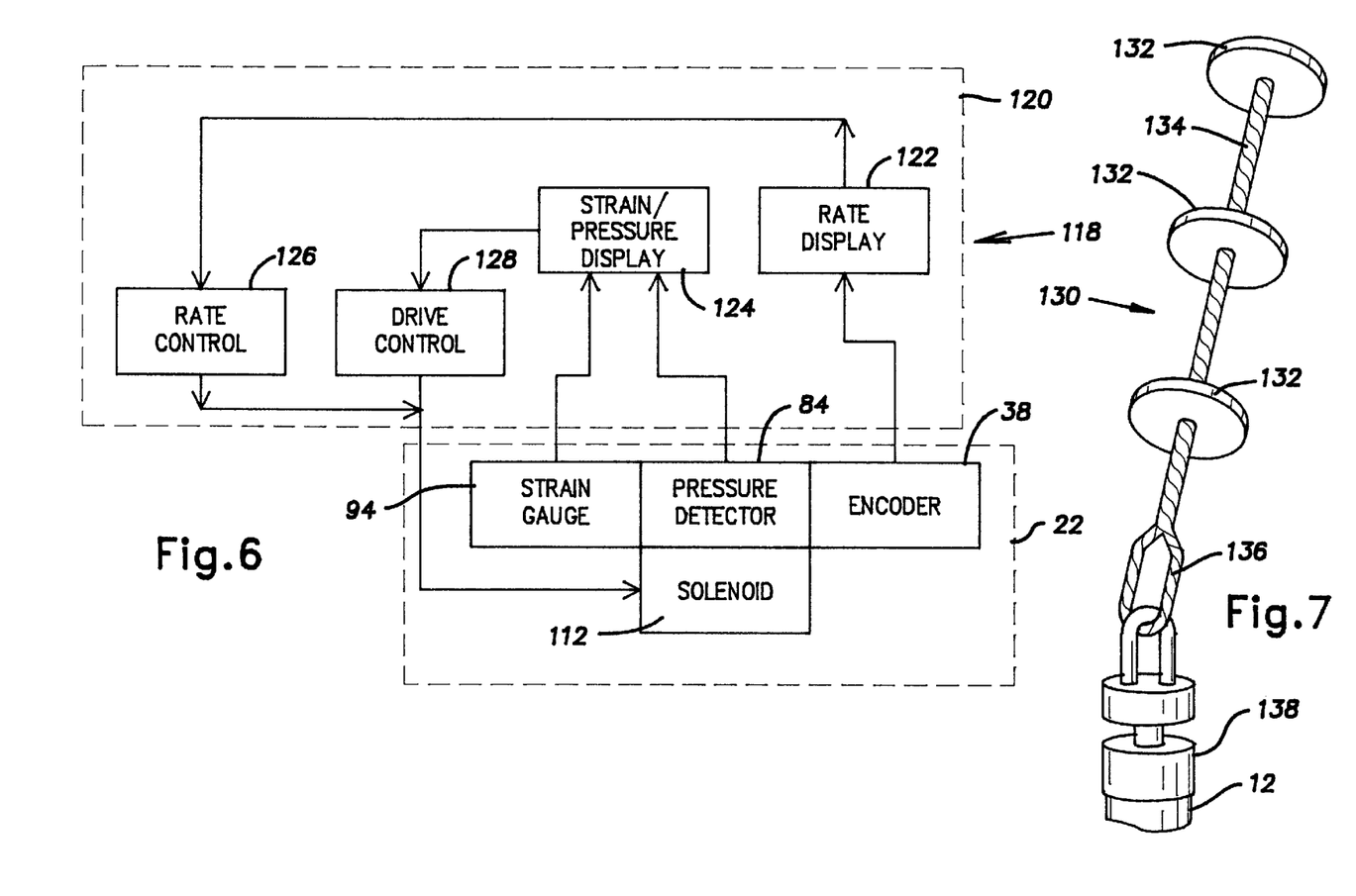
FIG. 6 shows a schematic diagram of a control system of the cable feeder.
FIG. 7 shows a perspective view of a cable pulling dart.

Referring to FIG. 6, a control system 118 includes the strain gauge 94, pressure detector 84, encoder 38, and solenoid 112 located on the cable feeder 22, as discussed above. The control system 118 also includes a display and alarm panel 120 having a rate display 122 (e.g., Red Lion Co. Part No. 50020) connected to the encoder 38, and a strain/pressure display 124 (e.g., Ottotech Series 260) connected to the strain gauge 94 and pressure detector 84. A rate control 126 is operatively connected to the encoder 38 and is connected for automatic or manual adjustment of the solenoid 112. A drive control 128 is operatively connected to the strain gauge 94 and the pressure detector 84. The drive control 128 is also connected for automatic or manual adjustment of the solenoid 112. The displays 122, 124 and controls 126, 128 can be provided with audible and/or visible alarms indicating certain operating conditions. The control system 118 can also be provided with recorders to store data collected during operation.

Referring to FIG. 7, prior to installation in the cable duct 70, a leading end of the cable 12 is provided with a dart 130. For example, the dart 130 includes several cylindrical plugs 132 each having a diameter the same as or slightly larger than the inside diameter of the cable duct 70 and conduit 14. The plugs 132 are made of a rigid or slightly flexible, low friction material, such as rubber or thermoplastic. The plugs 132 are interconnected by a flexible cord 134 securely fastened to the cable 12. A loop 136 is formed in the cord by weaving, for example. The cord 134 is secured to the cable 12 by a pivot connector 138 or universal joint connector that firmly grasps the end of the cable 12.

To set up the cable feeder 22, as shown in FIGS. 1 and 2, a length of cable 12 is unrolled from the reel 10 and inserted in the entrance duct 44. The cable 12 is positioned so that it extends from the end of the entrance duct 44 approximately the length of the cable feeder 22. The dart 130 is installed on the cable 12 and inserted into the guide duct 70. The cable feeder 22 is positioned adjacent the cable 12. The drive belts 34, injection block 36, encoder 50, clamps 40, 42, and seal inserts 64, 65 are separated to provide a generally horizontal passage into which the cable 12 is transversely inserted. The separated parts are then reassembled, closed, and secured to secure the entrance duct 44, cable 12, and guide duct 70 in the cable feeder 22. Alternatively, the conduit 14 can be fastened directly in the exit duct clamp 42. The stop 60 is installed and the handle 58 is turned to engage the tractor treads 54 with the cable 12 at a specified radial force.

Referring to FIGS. 2, 5, and 6, the compressed air 24, hydraulic source 26, and electric power 28 are connected and initiated to pressurize the plenum 68 and to activate the hydraulic system 104 and the control system 118. Air pressure builds up behind the dart 130 and propels the dart forwardly, pulling the cable 12 through the conduit 14. The actuator 106 is switched on to provide hydraulic fluid to the motors 62, and the drive belts 34 rotate, driving the cable through the conduit 14.

During operation, the encoder 38 monitors the length of cable 12 passing through the cable feeder 22. The length of cable and the rate at which the cable travels are displayed on the rate display 122. Rate information is provided to the rate control 126, which operates the by-pass valve 82. The by-pass valve 82 can divert a selected amount of hydraulic fluid away from the motors 62 to control the rotational speed of the motors, thereby controlling the rotational speed of the drive belts 34. The rate control, thus, maintains the cable rate within a selected range manually input to the rate control 126 before or during a cable feeding operation to minimize installation time while avoiding damage to the cable 12 and conduit 14. If the encoder 38 senses that the cable 12 has stopped or excessively slowed, for example because of an obstruction, the by-pass valve 82 diverts fluid to stop the drive belts 34, thereby preventing the drive belts from damaging the cable 12 and to prevent excessive axial compression of the cable. Typical cable installation rates are between about 100 to 200 feet per minute (fpm). Exemplary limits triggering alarms and/or stopping the driver are about 25 fpm and 250 fpm.

The pressure detector 84 senses the pressure in the hydraulic system at the motors 62. The pressure is displayed on the pressure display 124 and pressure information is provided to the drive control 128, which operates the solenoid 112 of the by-pass valve 82 based on a selected range of hydraulic pressures input to the drive control before or during operation. The hydraulic pressure used to power the driver 33 depends on the characteristics of the cable 12. In most cases the pressure is between about 500 and 1350 PSI. Lower and upper limits are in the range of 200 to 2000 PSI and are determined by the minimum power required to drive the cable and the force at which unwanted bending, deflection or axial compression of the cable occurs. The pressure control 110 can be adjusted to maintain the hydraulic pressure within the selected range to provide sufficient force to drive the cable 12 through the conduit 14 while preventing damage to the cable.

The pressure display 124 also displays axial force applied to the cable based on information from the strain gauge 94. The axial force information is used to operate the by-pass valve 82 to limit the axial force applied to the cable 12 to prevent damage thereto. Again, the range of forces is determined by cable characteristics. Typical forces range from 30 to 300 pounds, with alarms being triggered outside the normal range. If the pressure detector 84 or strain gauge 94 senses an excessive axial force on the cable 12, the by-pass valve 82 stops the drive belts 34 to prevent the drive belts from damaging the cable 12 and to prevent excessive axial compression of the cable. The hydraulic system can be arranged to stop the motors, allow the motors to free-wheel or otherwise discontinue driving of the cable on the specified condition.

Cable installation is monitored and controlled by the control system 118 to provide efficient feeding of the cable 12 into the conduit 14. Parameters are set and adjusted to minimize installation time while preventing damage to the cable. The control system 118 is adapted to adjust or discontinue operation of the cable feeder 22 in the event of obstructions or other impediments to cable movement.

Figure 8:
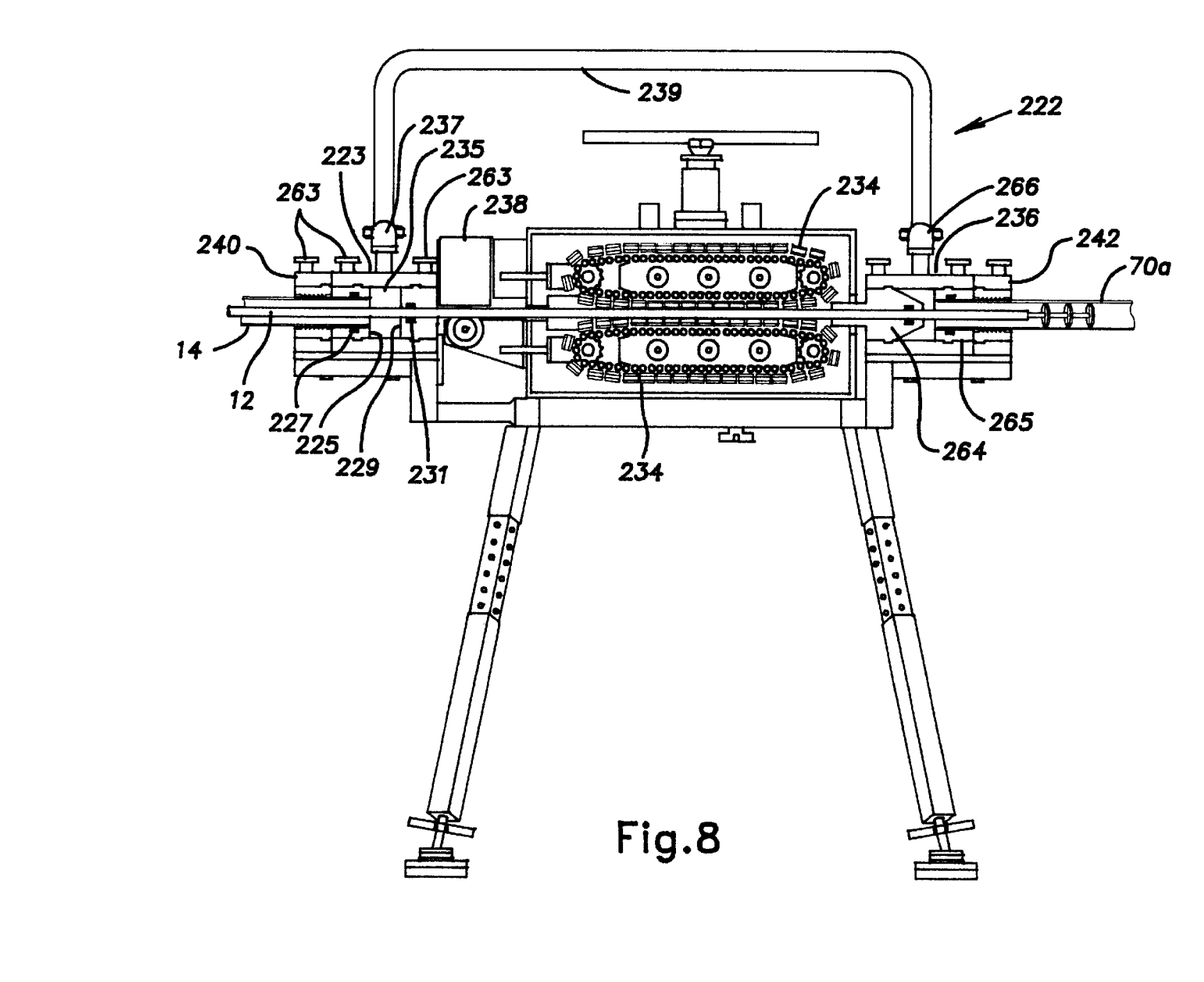
FIG. 8 shows a partially cut away elevational front view of the cable feeder in a mid-assist configuration.

Referring to FIG. 8, the cable feeder 222 is arranged in a "mid-assist" configuration. The cable feeder 222 is substantially identical to the cable feeder 22 shown in FIG. 2, except for modifications discussed below. In fact, the cable feeder 22 of FIG. 2 is designed to be easily adapted for the configuration shown in FIG. 8. A downstream end of the conduit 14, or a duct in communication with the conduit, is firmly mounted in the entrance duct clamp 240. The cable 12 passes from the conduit 14 into the cable feeder 222. An air ejection block 223 is disposed between the entrance duct clamp 240 and the encoder 238. The ejection block 223 is similar in construction to the injection block 236 and has an entrance seal insert 225 including, for example, a pair of gaskets 227 engaging the conduit 14. An exit seal insert 229 has a pair of gaskets 231 engaging the cable 12. The ejection block 223, seals 225, 229, and duct clamp 240 are each separable into halves and secured together by handles 263 and threaded members. The ejection block 223 defines a plenum 235 therein in communication with the conduit 14. The plenum communicates with an ejection fitting 237 connectable to one end of a by-pass pipe 239, such as a rigid tube or flexible hose. The other end of the by-pass pipe 239 is connectable to the fitting 266 of the air injection block 236 to place the conduit 14 in communication with a succeeding duct 70a. The cable 12 is driven by the drive belts 234 and passes into the succeeding cable duct 70a where pressurized air conveyed by the by-pass pipe 239 propels the cable 12 forwardly through a succeeding conduit.

To set up the mid-assist cable feeder 222, the cable 12 is positioned so that it extends from the end of the conduit 14 approximately the length of the cable feeder 222. The dart 130 is inserted into the succeeding cable duct 70a. The cable feeder 222 is positioned adjacent the cable 12. The drive belts 234, ejection block 223, injection block 236, clamps 240, 242, and seal inserts 225, 229, 264, 265 are separated to provide a generally horizontal passage into which the cable 12 is transversely inserted. The separated parts are then reassembled, closed, and secured to secure the conduit 14, cable 12, and duct 70a in the cable feeder 222.

Operation of the mid-assist cable feeder 222 in the mid-assist configuration is substantially the same as described above for the cable feeder 22, except that the compressed air is transferred from the upstream conduit 14 to the succeeding conduit 70a, thus, no additional compressed air source is required. The mid-assist feeder 222 should not be operated without the by-pass pipe 239. To coordinate the drive belts 34, 234, controls from the cable feeders 22, 222 can be connected together.

The present disclosure describes several embodiments of the invention, however, the invention is not limited to these embodiments. Other variations are contemplated to be within the spirit and scope of the invention and appended claims. Terms for such elements as the seals, inserts, pipe, conduits, and ducts are selected to distinguish among different parts of the invention and are not intended to limit the materials or configurations of these elements, as will be apparent to one skilled in the art.

What is claimed is:

1. An apparatus for installing cable from a first conduit into a succeeding conduit, said cable being propelled through said first conduit by compressed air in the first conduit, said apparatus comprising:

a driver adapted to engage the cable mechanically to propel the cable forwardly into the succeeding conduit the driver including at least one rotating member adapted to engage the cable to propel the cable forwardly; and a pipe connected to define an airtight passage between the first conduit and the succeeding conduit, said pipe being adapted to direct the compressed air into the succeeding conduit to propel the cable through the succeeding conduit.

2. An apparatus according to claim 1, further comprising:

a first seal for mounting an end of the first conduit from which the cable projects adjacent an entrance end of the driver; and a second seal for mounting an end of the succeeding conduit into which the cable is to be installed adjacent an entrance end of the driver.

3. An apparatus according to claim 2, wherein the seals define respective plena communicating the conduits with the pipe and isolating the driver from the compressed air.

4. An apparatus according to claim 3, further comprising seals around the cable to isolate the plena from ambient air.

5. An apparatus according to claim 1, further comprising a sensor for measuring axial force applied to the cable by the driver, the sensor connected to the conduit downstream of the rotating members for constantly measuring axial force applied to the conduit by the cable moving therethrough to indicate axial compressive loads on the cable, the sensor measuring the axial force on the conduit while the cable is moving in an axial direction regardless of the deflection of the cable at the point of measurement, the axial compressive loads on the cable being applied primarily by the rotating members.

6. An apparatus according to claim 1 which further includes a radial force limiter for limiting radial force applied to the cable by the rotating members.

7. An apparatus according to claim 1, further comprising a threaded member adapted to position at least one of said rotating members, said spring being operatively disposed between the threaded member and the rotating member.

8. An apparatus according to claim 1, wherein said limiter further comprises a calibrated stop that limits travel of the threaded member to limit a force of the spring applied to the rotating member.

9. An apparatus according to claim 1, wherein the driver includes opposing rotating members.

* * * * *